United States Patent [19]

Hettinger, Jr.

[11] Patent Number: 4,720,477
[45] Date of Patent: Jan. 19, 1988

[54] METHOD FOR CONVERTING COAL TO UPGRADED LIQUID PRODUCT

[75] Inventor: William P. Hettinger, Jr., Russell, Ky.

[73] Assignee: Ashland Oil, Inc., Ashland, Ky.

[21] Appl. No.: 890,784

[22] Filed: Jul. 23, 1986

Related U.S. Application Data

[63] Continuation of Ser. No. 786,186, Oct. 10, 1985, abandoned, which is a continuation of Ser. No. 507,865, Jun. 27, 1983, abandoned.

[51] Int. Cl.$^4$ .................... B01J 11/40; B01J 23/00; B01J 21/08
[52] U.S. Cl. .................... 502/255; 502/254; 502/313; 502/314; 502/309; 204/157.42; 204/157.51; 204/157.45
[58] Field of Search ............... 502/254, 255, 263, 313, 502/314, 309; 208/216 R, 422, 435; 204/157.42, 157.51, 157.45

[56] References Cited

U.S. PATENT DOCUMENTS

| | | | |
|---|---|---|---|
| 3,840,477 | 10/1974 | Braithwaite et al. | 502/254 |
| 4,389,301 | 6/1983 | Dahlberg et al. | 208/111 |
| 4,552,642 | 11/1985 | Hettinger, Jr. | 208/422 |

*Primary Examiner*—Helen M. S. Sneed
*Assistant Examiner*—Chung K. Pak
*Attorney, Agent, or Firm*—Richard C. Willson, Jr.; Stanley M. Welsh

[57] ABSTRACT

An H-Coal Process hydrogenation operation and catalyst life is substantially improved when using colloidal particles of catalyst comprising a colloidal matrix of silica, alumina, titania and combinations thereof coated with hydrogenating components selected from cobalt, molybdenum, nickel, tungsten and combinations thereof. The colloidal catalyst activity may be altered by alkaline promoters, other metals and acidic promoters.

17 Claims, 2 Drawing Figures

$C_{61}H_{46}N_2O_4$

900 MOLECULAR WEIGHT

73 PERCENT AROMATIC C

60 PERCENT AROMATIC H

20 LABILE H/100 C

FORMAL AVERAGE STRUCTURE FOR WEST
KENTUCKY ASPHALTOL (SESC-8) 40

METHOD FOR CONVERTING COAL TO UPGRADED LIQUID PRODUCT

This application is a continuation of application Ser. No. 786,186, filed 10/10/85, abandoned, which is itself a continuation of U.S. Ser. No. 507,865, filed 06/27/83, abandoned.

BACKGROUND OF THE INVENTION

Coal is considered to be a dirty fuel due in part to its ash and sulfur content. Therefore, considerable effort has been expended to develop clean fuels from coal in the form of gaseous products, liquid products and solid products. The production of relatively clean liquid fuels may be obtained by first producing clean syn gas comprising hydrogen and carbon monoxide thereafter converted by Fischer-Tropsch synthesis to liquid products. On the other hand, the coal may be heated sufficiently to produce naturally occurring oils and the thus obtained oils then treated with hydrogen for desulfurization and quality improvement. However, such a pyrolysis process produces considerable gas and a char product requiring disposal.

Another route for achieving clean fuels from coal involves dissolving coal in a solvent, filtering and catalytically treating the liquid product with hydrogen to remove sulfur and improve the quality of the liquid product and recycling the hydrotreated product as a preferred solvent. There are two primary techniques associated with catalytic hydroliquefaction solvent treating coal known as the Synthoil Process and the H-Coal ™ Process.

The Synthoil Process slurries crushed and dried coal particles in a portion of its own liquefaction product oil. The slurry is fed to and passed downwardly through a fixed bed of catalytic material in a reactor and contacted therein with turbulently flowing hydrogen. The purpose of this treatment is to liquefy and desulfurize the coal liquid product. A commercially available hydrogenation catalyst comprising cobalt-molybdate on silica activated alumina is a typical catalyst. The product of this operation passes through a high pressure receiver where a gaseous product is separated. The product slurry oil is passed to a low pressure receiver before being contrifuged to remove ash and organic coal residues. Part of the centrifuged oil is recycled for use as slurry oil.

In the H-Coal process, coal is pulverized, dried and slurried with coal derived oil. The slurry thus obtained is mixed with hydrogen, heated and fed to a reaction zone comprising an ebullating bed of hydrogenation catalyst such as a cobalt-molybdenum desulfurizing catalyst. The coal liquid slurry is hydrogenated and converted to liquid and gaseous products. The reaction conditions are normally about 454° C. (850° F.) at 2700 psig. In this prior art known operation, a constant catalyst activity is maintained by adding and withdrawing the catalyst continuously. A slurry of unconverted coal and liquid product is removed from the reactor and recycled to the bottom of the reactor while a slip stream is withdrawn and sent to an atmospheric pressure flash drum. Flashed vapors are passed to an atmospheric distillation tower and the bottoms products are processed in a vacuum tower to obtain vacuum distillate overhead and a vacuum bottoms slurry product. A part of the heavy distillate product obtained from the top of the vacuum unit and the bottom of the atmospheric distillation operation are recycled as liquefaction slurry oil for admixture with dried and pulverized coal particles.

The primary objective of coal liquefaction is to produce a low sulfur and low ash fuel. This is achieved by treating coal at an elevated temperature and hydrogen pressure under conditions promoting hydrogen transfer. This may be carried out either in the presence or in the absence of an added catalyst depending on the type of coal being processed and product desired. It is generally agreed that the production of liquid fuels from coal requires the formation of asphaltenes and hydrogenative conversion of the asphaltenes to an oil product. The asphaltenes which are formed as intermediates in the liquefaction of coal are operationally defined as material soluble in benezene and insoluable in aliphatic hydrocarbons such as pentane and hexane. Thus conversion of coal to asphaltenes takes place at a temperature of about 399° C. (750° F.) or above in the presence of a hydrogen donor material. The conversion of the thus formed asphaltenes to oil product on the other hand takes place at a resonable rate in the presence of molecular hydrogen of high pressure with a hydrogenation catalyst and at relatively high temperature in the range of 371° to 482° C. (700° to 900° F.).

It has been observed by early workers in the field that bituminous coal can be solubilized at elevated temperatures by aromatic hydrocarbons comprising an angular arrangement of rings such as phenanthrene. It is poorly achieved with aromatic hydrocarbons with a linear arrangement of rings such as provided by anthracene. That is, phenanthrene will dissolve up to 95 percent of coal components and anthracene only about 24 percent thereof. It has been further observed that the solvating power of the liquid is improved considerably as its hydrogen content is increased.

There are a large number of potential catalyst types available for use in a coal liquefaction process. Catalysts such as zinc and tin chloride have been shown to be successful, but are expensive, require relatively exotic materials for containment, and cause contamination and disposal problems of materials in the products. Some disposable catalysts resistant to poisoning which do not cause problems with metallurgy or products, appear much too expensive (high metals usage) and do not appear to take full advantage of the metals present. Supported metal oxide catalysts such as is used in the II-Coal system, have been demonstrated to be successful. However, these catalysts are highly susceptible to rapid poisoning by carbon, pore structure blockage, and to slow irreversible poisoning due to contaminant metals and active molybdenum loss. These catalysts are also susceptible to attrition and physical damage within the reaction systems. Diffusional limitations within the pore structure of these catalysts is also a key mechanistic constraint.

Major problems in coal liquefaction by supported catalyst systems are pore blockage by carbon deposition, diffusion and mass transfer limitations of the very large asphaltene/preasphaltene molecules within the relatively small, accessable pores, and metals poisoning (particularly by iron, titanium, and calcium) plus active hydrogenation metals loss.

Pore blockage is the classic initial problem with supported catalysts. Very rapid deposition of metal contaminants and carbon reduce virgin catalyst activity by 80 percent and substantially as soon as the catalyst is subjected to the liquefaction environment. This problem is ameliorated by either increasing the size (and/or number) of the pores, or by reducing particle size of the catalyst to make more surface area accessible near the particle surface. An excellent example of this is shown in FIG. I, where external surface area is plotted versus particle diameter.

Diffusional limitation of large molecules within the catalyst particle is improved by reducing the particle size of the catalyst, increasing the size of the catalyst, increasing the size of the pores, and/or increasing the number of feeder pores. However, for the larger asphaltene and/or preasphaltene molecules, such as shown in FIG. II, it is difficult to conceive of a mechanism by which an active (internal) site could be accessed. Thus, because of the limitations of this setup, it is critical to improved catalytic liquefaction conversion performance as these large molecules are specifically the type of molecules which must be converted.

Metals poisoning and active metals loss can be bypassed to some extent by use of a disposable catalyst system. Metals poisoning of this type has been found to be relatively slow, and thus is not considered a major factor in the liquefaction processed needed to be overcome.

BRIEF DESCRIPTION OF THE DRAWINGS

FIG. I is a plot of external surface area vs. particle diameter.

FIG. II is a diagram of the formal average structure for West Kentucky Asphaltol.

SUMMARY OF THE INVENTION

Figure 1:
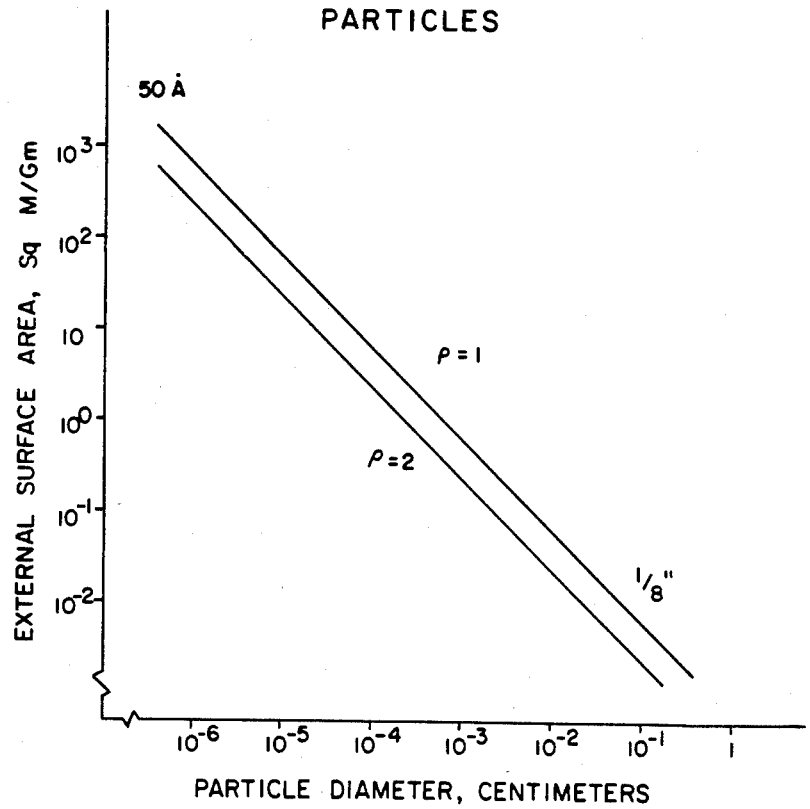
Figure 2:
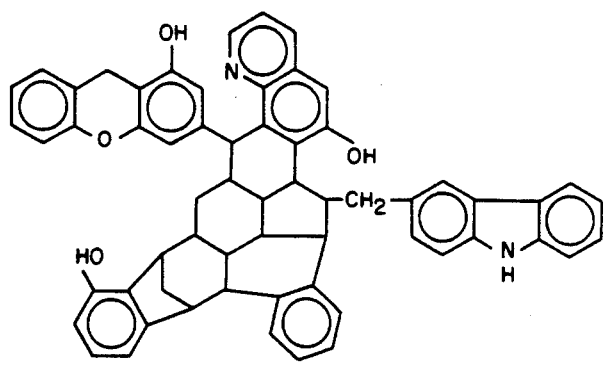

It is believed that many, if not all, of coal liquefaction problems can be minimized by reducing the particle size of the hydrogenation catalyst to colloidal size catalyst particles. It is thus necessary to effect preparation and utilization of colloidal particles, 50 to 200 Angstroms in diameter, comprising a matrix material such as that provided by colloidal silica, alumina, and/or alumina-coated silica, which matrix is impregnated and/or coated with active metal oxides such as cobalt molybdate or nickel molybdate or nickel tungsten. Preparation of catalyst particles of a colloidal size will substantially increase the exterior accessible active particle surface area by a factor considered at least in the same range as the inaccessible internal surface area in a more convential extrudate hydrogenation catalyst system or composition.

This large increase in external surface area of the colloidal catalyst will substantially reduce diffusional limitations and provide a substrate by which active sulfided metal oxides of the hydrotreating catalyst are accessible to essentially all large multi-ring molecules directly and in the absence of substantial pore blockage or hydrogen donor intermediaries. Thus the large multi-ring molecule shown in FIG. II will have greater direct catalytic access to the large active external surface area of the colloidal particles.

The use of a disposable colloidal particle in the 50-200 Angstrom-size range is considered beneficial during the liquefaction operations. That is, a substantial concentration of these colloidal particles, when using particularly process derived liquid product or hydroclone material can be expected to be retained in the recycled hydroclone material overflow.

Applicant's approach is to provide a catalyst composition and system designed to eliminate intermediary or transfer agent reactions by providing direct accessibility of a very extensive catalytic surface area to the large molecules comprising preasphaltenes and asphaltene-type material which by their size and rapid rate at which internal pores are plugged, are normally not able to receive direct hydrogenation. For example, with a 1/16" catalyst extrudate, only a very small "portal" surface (much less than 1 m$^2$/gm) is available for direct hydrogenation as against a colloidal catalyst with surface area accessibility of $10^2$ to $10^3$ m$^2$/gm (100-1000 m$^2$/gm) directly as shown by FIG. I.

It is applicant's position that this problem of inaccessibility is substantially effectively addressed by use of a colloidal size, supported metal disposable catalyst system. The use of a colloidal system is intended to substantially reduce or eliminate diffusional limitations by providing substantial, if not all, active catalytic sites as external active surface area sites. Carbon and/or contaminant metals poisoning is minimized by catalyst disposal; catalytic efficiency is maximized by use of a silica, alumina, or a silica-alumina matrix support; and selectively for desired hydrogenation and heteroatom removal reactions is tailored by the use of a proper type and combination of hydrogenation catalytic metal oxides as herein provided.

The catalyst composition (system) of this invention requires the addition of appropriate metal oxides on a colloid support material comprising in one embodiment an alumina-coated silica colloid; a silica or an alumina colloid alone. By the use of select colloid particles of a particle size below 200 Angstroms and preferably below 100 Angstroms comprising the hydrogenation metal oxides on the surface of the colloid will be more favorably disposed for hydrogenating large molecules. The metal oxides (sulfides) thus deposited as colloids will exhibit a much higher surface area and thus will have a much higher activity than experienced with the larger more conventional extrudate catalyst particles of 1/32 inch size and larger of limited diffusion activity. Because of this much higher available catalytic surface area provided by the high activity colloidal catalytic material, the amount of oxide catalyst deposited per unit weight of support (matrix) may be less in some applications than that present on available more conventional larger particle hydrogenation coal liquefaction catalysts by as much as 15 wt % or more. Thus, the coal liquefaction catalyst of this invention utilizes a colloid system of silica, alumina, or alumina coated silica particles of 50 Angstroms of smaller or larger particle size that have been impregnated with the appropriate metal oxides, e.g., cobalt-molybdate; nickel-molybdate; or nickel-tungstate, possessing catalytic activity for hydrogenation, hydrocracking, hydrodenitrogenation, desulfurization, and deoxygenation activities.

The colloidal catalyst complex (system) of the invention may be utilized for upgrading poor quality liquids and/or heavy oils produced from tar sands, bitumen, crude oils and shale oil. In the case of shale oil, it may be used particularly for catalytically reducing the arsenic content of shale oil prior to or during hydrotreating thereof. The use of a colloidal catalyst system to reduce the arsenic content of shale oil can also be used to greatly extend the cycle life and activity of a more expensive hydrotreating catalyst comprising platinum group metals by admixture therewith or in a pretreating step before a more conventional hydrogenation/hydrocracking process.

By using a colloidal hydrogenation catalyst complex (system) as herein provided, a once-through or recycle operation for coal liquefaction is contemplated for enhancing the useful life of the catalyst system employed. Conversion by hydrogenation during coal liquefaction is associated with the parameters of liquid production, % desulfurization, % denitrogenation, % deoxygenation, aromatic saturation and molecular weight reduction.

The catalyst compositions of this invention comprising colloidal size material dispersed in a liquid medium is based upon the concept of impregnation or dispersion of one or more metal oxides of cobalt, nickel, molybdenum or tungsten on an alumina and/or silica colloid or other suitable colloid material. Silica and/or alumina and/or titania colloids can be a part of the catalyst composition. The activity of these catalyst compositions (systems) can be enhanced through the use of one or more promoters. These promoters include alkaline materials, other metals below identified, and acid materials identified below.

1. Alkaline Promoter
    (a) Group II metals such as Ba, Sr, Ca
    (b) Rare earths
    (c) Group I metals such as Cs, Rb
2. Other Metals
    (a) Mu, Bi
    (b) Ph, Sn
    (c) Th, In
    (d) Cr, V
3. Acidic Promoters
    (a) Halogens
    (b) Phosphate, boria
    (c) $TiO_2$, $ZrO_2$
4. Concentration of promoter would be about 0.01–1 wt. %.

The present invention is particularly concerned with that portion of an H-Coal Process Liquefaction relied upon to produce desired coal oil products involving the step of catalytic conversion with hydrogen of preasphaltene and asphaltene containing materials to produce quality liquid oil products and effect desulfurization and denitrogenation thereof. In one particular aspect, the present invention is concerned with maintaining the activity of a hydrogenation catalyst employed in a high order of activity whereby withdrawal and replacement of catalyst particles with fresh catalyst can be reduced by substantial orders of magnitude. In yet another more specific respect, the present invention involves the employment of a colloidal particle hydrogenation catalyst of desired composition dispersed in a liquid medium miscible with the liquid phase of, for example, the M-coal Process coal oil whereby the hydrogenating catalyst particles employed are at an elevated temperature and pressure selected as herein provided. An ebullating bed of catalyst particles may be retained in the reaction zone with colloidal catalyst particles added continuously or intermittently over an extended time of operation and/or withdrawn and replaced with fresh particles of catalyst of a much lower rate. The present invention also involves the employment of a colloidal hydrogenation catalyst alone whereby the ebullating bed of catalyst particles is not utilized in association therewith.

A particular objective of the present invention is to prepare colloidal particles of silicon oxide, alumina or a combination thereof, with the silica colloid coated with one or more layers of alumina and then further coating such colloid with hydrogenation components such as cobalt-molybdena, nickel-molybdenia, and nickel-tungstate in a desired amount. The colloidal particles thus prepared of a size in the range of 20 to 225 Angstroms, preferably 25–75 Angstroms in diameter, are dispersed in a liquid medium which is miscible with the oil phase encountered in the coal liquefaction process herein discussed. Thus, the colloidal particles are dispersed in a material such as an organic hydrocarbon medium such as tetralin, benzene, naphthalene, phenanthrene and anthracene or other suitable miscible hydrocarbon solvent material, for ease of introduction into the solubilizing oil phase.

An important aspect of the inventive contribution of the present invention is concerned with the method and technique for preparing the colloidal particles above identified and providing dispersion thereof in a suitable liquid dispersant for use as herein provided.

In yet another aspect, the colloidal catalyst particles of this invention are of a composition comprising two or more hydrogenating compounds of from 1–8 wt % nickel oxide, 2–8 wt % cobalt oxide, 3–20 wt % molybdenum oxide and 5–20 wt % tungsten oxide. On the other hand, the catalyst particles may comprise from 1 to 4 wt % of nickel oxide, from 1–4 wt % cobalt oxide or 3–12 wt % tungsten oxide. The catalyst particles of colloidal particle size and prepared from alumina colloid, silica colloid, and alumina coated silica colloid to form colloidal hydrogenation catalyst particles are of a size in the range of 20 to 225 Angstroms or of a size in the range of 25 to 75 Angstroms. The colloidal catalyst particles are employed in the hydrogenative conversion of coal oil at a concentration in the range of 5 to 10,000 ppm and more usually at least 100 ppm with or without the presence of larger size hydrogenation catalyst particles as employed in an ebullating catalyst bed system. The colloidal catalyst particles are recycled with hydroclone to the liquid phase hydrogenation zone of an H-Coal Process by one or both of a heavy distillate product of coal oil hydrogenation and/or with a separated slurry bottoms product of coal liquefaction to which freshly ground coal is added for liquefaction hydrogenation conversion thereof.

The hydrogenation operation of the invention may be accomplished at a temperature in the range of 399° to 454° C. or 482° C. (750° to 850° F. or 900° F.) at a pressure in the range of 2,000 to 4,000 psig and a molecular hydrogen addition rate in addition to recycled hydrogen donor materials in the range of 500 to 3,000 standard cubic feet of hydrogen per barrel of coal slurry oil.

It will be recognized by those skilled in the art that some minor departures may be made to the conditions herein recited with respect to a H-Coal Process liquefaction and hydrogenation operation and in the colloidal catalyst compositions identified without departing from the essence of the invitation described and such departures will be considered an invasion of the inventive concepts herein expressed.

The special colloidal composition particularly desired in accordance with this invention is found difficult to produce in the absence of a carefully controlled sequence of preparation steps. In one preparation sequence, a fine particle (colloidal) suspension of aqueous silica-alumina ($SiO_2/Al_2O_3$) colloid coated with cobalt-molybdena mixture was prepared in an aqueous medium and then dispersed first in ethyl cellusolve (ethylene glycol monoethyl ether) by replacing the water by successive vacuum flash evaporations. The cellusolve was then replaced with tetralin using flash evaporation.

This sequence of steps produced a very deep blue colored suspension of Co/Mo on alumina with a silica core of colloidal particle size comprising approximately 15 percent or less solids in the suspension depending on the loss of particles encountered in the preparation.

The colloidal suspension desired for use in the process and method of this invention may be prepared in the following manner.

EXAMPLE 1

A commercially available material identified as a deionized pure $SiO_2$ acidic sol of about 3.2 pH is used as a starting material. This material is readily miscible with water miscible organic solvents such as ethyl cellusolve and is a starting material for the preparation of alumina coated silica sols and organic solvent dispersed colloidal silica. In this preparation, 16 grams of $CoO_3$ powder is added slowly (at least 5 minutes) to a hot agitated solution/suspension of an-acidic molybdenic solution and heated to a temperature in the range of 80°–85° C. for about ½ hour. At this point of the preparation, the real problem is to bring the solution/suspension of $Co(H_2O)_6++$ cations and complex anionic isopolymolybdic anions in contact with a positively charged colloidally dispersed alumina coated silica sol without causing an irreversible coagulation of the colloid. This was accomplished by the method of this invention by diluting about 170 ml of the alumina coated silica sol suspension with 530 ml of cellusolve and very slowly adding this material drop by drop to 1200 ml of the cobalt-molybdenic solution/suspension formed above. This is accomplished at a temperature, 80°–85° C., using maximum available ultrasonic agitation over an extended period of time of at least 3 hours. A violet or purple stable suspension of particles is obtained. The suspended particles appeared to be relatively free of occluded water. A substantial amount of the liquid volume is lost by evaporation and is brought up to 1300 ml by adding ethyl cellusolve comprising colloidal silica coated with alumina. During this addition, the color of the suspension gradually changed from pink to violet or purple. Five hundred ml of the above material is placed in a flash evaporation zone. The preparation at this point in the procedure is not miscible in tetralin. Two flash evaporations of the 500 ml solution/suspension were carried out, removing about 200 ml of cellusolve after the first and second flash evaporations. The cellusolve is then replaced with tetralin by replacing the volumes of liquid distilled over in the evaporator by tetralin. Cellusolve has a boiling point of 136° C. at 1 atmospheric pressure and tetralin boils at 207° C. A product of this evaporation sequence comprising tetralin as the liquid phase in an amount of about 300 ml is observed to be deep blue in color. The percent of suspended solids was determined to be about 15 percent. A portion of this product identified as ACT-31 was mixed with a 1/1 by volume mixture of cellusolve and tetralin and flash evaporated. A purple muddy precipitate immiscible with tetralin separated out from the tetralin supernatant. This purple precipitate was redispersed in cellusolve and flash evaporated several times to remove water present and to form a stable dispersion of the particles in tetralin. This redispersed stable suspension was designated ACT-31A. Some of the precipitate obtained as above identified was redispersed in tetralin using the ultrasonator and heat. This sample was designated ACT-31B. Another portion of the precipitate was heated to dryness above 200° C. The dried particle precipitate assumed a dark blue coloration and was then redispersed in tetralin. This sample was labeled ACT-33.

Following several other preparation sequences, it was observed that the following preparation technique was the method of choice.

EXAMPLE II

In this preparation, to one liter of deionized water at 80°–85° C. or about 180° F. is added slowly 20 grams of $MoO_3$ and then in a similar manner there is added 16 grams of powered $CoCo_3$ cobalt carbonates. The mixture is stirred and heated for approximately one-half hour. With an ultrasonator at maximum setting (65) and partially immersed in the Co/Mo solution there is added slowly and at a controlled rate a mixture of 70 ml of colloidal silica coated with alumina in 430 ml of ethyl cellusolve. It is preferred that the temperature be maintained about 180° F. during this mixing and addition period. A volume of product of about 1000 ml is obtained after substantial water evaporation. The 1000 ml of product is flash evaporated until about 400 ml of water and cellusolve have been evaporated. This evaporated liquid portion is replaced with pure cellusolve. After effecting a sequence of flash evaporations providing particles deep blue in color, the temperature is gradually raised during evaporations and the displaced cellusolve is replaced with tetralin. A final product of 500 ml liquid volume comprising a solids content of about 8.6 wt. percent is obtained. This method of preparation may be implemented by employing a commercially available colloid of silica coated with alumina and prepared by the technique of U.S. Pat. No. 3,252,517.

The method and concepts of this invention are directed to the development of supported and disposable catalyst systems suitable for use in the H-Coal Process, H-Oil Process, Synthoil and/or a hydrogen-donor process such as the HDDC process and which may be relied upon to maintain and/or improve the selectivity of catalyst systems used in a coal liquefaction system to form desulfurized oil products from asphaltenes. It is said that the liquefaction of coal to form clean liquid oil products goes through a sequence of preasphaltene formation with such material thereafter being converted to oil product or to asphaltenes and then to oil products by catalytic hydrogenation at relatively high temperatures in the range of 371° C. (700° F.) to 482° C. (900° F.) and a pressure within the range of 1500 to 3500 psig. A primary object of the present invention is to maximize total distillate oil yield from coal liquefaction with improving product quality a secondary objective. On the other hand, maximization of the total distillate oil product depends in substantial measure upon maintaining the catalyst hydrogenating activity as well as its on stream life. The present invention is concerned with achieving these objections.

The use of supported hydrogenating catalyst systems to achieve conversion of asphaltenes to desulfurized quality oil products has received the greatest amount of attention. However, these catalyst employed as an ebullating mass of solid particles in a liquid phase reaction zone with all their success are highly susceptible to rapid carbon fouling along with irreversible metals poisoning. The present invention is particularly concerned with prolonging the active life of the supported catalyst systems now employed such as in the H-coal Process as well as the selectivity thereof by the selective addition of a colloidal suspension of the catalyst ingredients dispersed in a solution miscible with the oil/asphaltene phase existing in the hydrogenation reaction zone. The preferred colloidal catalyst ingredients are prepared as above provided and are suspended in a liquid hydrocarbon phase in an amount suitable for addition to a reaction zone such as the H-Coal Process reaction zone either with or without previously charged larger size hydrogenation catalyst particles material used as an ebullating bed of catalyst particles suspended in a high boiling liquid phase.

A major problem recited above in coal liquefaction and hydrogenation of formed coal oil product by supported catalyst systems are related to pore blockage by carbon deposits, diffusion and mass transfer limitations of the very large asphaltenes/preasphaltenes molecules within relatively small accessible pores along with metals posioning by iron, titanium and calcium plus some active hydrogenation metals loss.

Each of the above identified catalyst problems can be reduced in substantial measure by reducing the particle size of the catalyst employed. It is proposed in one embodiment to utilize the colloidal particles of catalyst above identified alone or in combination with more conventional larger size fluid hydrogenation catalyst particles of the prior art and of a size suitable for use as an ebullating bed of catalyst particles dispersed in a liquid phase. The colloidal catalyst particles of this invention employed as herein provided may be prepared from materials selected from colloidal silica, alumina, alumina coated silica, further coated with active hydrogenation metals such as cobalt-molybdenum, nickel-tungsten, nickel-molybdenum and obtained from $CoCO_3$; $NiCO_3$; $Co(NO_3)_2$; $Ni(NO_3)_2$; $CoCl_2$; $NiCl_2$; $H_2MoO_4$, ammonium molybdate or tungstate, tungstic acid and sodium molybdate.

An evaluation of some catalyst systems provided some interesting results as discussed below.

EXAMPLE III

In this evaluation a fine mesh coal is dispersed in a oil liquefaction product as discussed herein particularly with respect to the H-Coal Process. The catalyst employed in the different runs were as follows. In run number 1, the catalyst was a presulfided colloidal material identified above as ACT-33 catalyst material, In run number 2, the catalyst was a mixture of a typical cobalt-molybdenum dispersed in alumina catalyst identified as 1442A and used in the ebullating catalyst system of H-Oil processing. This catalyst 1442A is used in combination with the colloidal suspension prepared above and identified as ACT-33. A portion of spent 1442A catalyst obtained from an H-Oil pilot plant was extracted with THF (tetrahydrofuran) to remove deactivating materials particularly comprising preasphaltenes.

The catalyst mixture used in run number 2 was presulfided. In run number 3, THF extracted 1442A (CoMoAl) was employed without presulfiding. In run number 4, the colloidal suspension identified as ACT-33 was used without presulfiding the catalyst.

The catalyst evaluation runs were completed in a microautoclave at a temperature of 454° C. (850° F.) and an elevated pressure in which the gram weight of catalyst solids per gram of coal varied as follows:
Run 1—0.16 (ACT-33) presulfided
Run 2—0.2 (1442A) and 0.02 (ACT-33) presulfided
Run 3—0.2 (1442A)
Run 4—0.16 (ACT-33)

The results obtained in these catalyst evaluation runs are as follows:

| Run Number | 1 | 2 | 3 | 4 |
|---|---|---|---|---|
| Time - Minutes | | 30.0 | | |
| THF Conversion | 84.8 | 86.8 | 84.6 | 83.0 |
| Yields, DAF wt. % | | | | |
| Gases | 4.7 | 5.0 | 6.7 | 5.0 |
| Oils (Oil & Gas) | 44.7 | 67.1 | 55.0 | 49.9 |
| Asphaltenes | 30.8 | 6.5 | 20.3 | 22.7 |
| Preasphaltenes | 4.7 | 8.1 | 2.6 | 5.4 |
| Methane | 1.85 | 1.31 | 2.18 | 1.80 |
| Ethane | 0.81 | 0.89 | 0.97 | 0.91 |
| Propane | 0.37 | 0.62 | 0.60 | 0.34 |
| Propylene | 0.00 | 0.03 | 0.00 | 0.00 |
| Isobutane | 0.00 | 0.00 | 0.00 | 0.00 |
| N—Butane | 0.10 | 0.14 | 0.09 | 0.07 |
| $CO_2$ | 1.56 | 1.40 | 1.72 | 1.84 |
| CO | 0.00 | 0.00 | 0.84 | 0.00 |
| $H_2S$ | 0.00 | 0.60 | 0.23 | 0.03 |
| $C_1$—$C_4$ Gases | 3.12 | 2.98 | 3.83 | 3.12 |
| Oil Select. | 0.526 | 0.774 | 0.650 | 0.601 |

It will be observed upon consideration of the data of these catalyst evaluation runs that at the levels of conversion identified, run number 2 achieved the greatest reduction in asphaltenes to form oils (oil and gas) in substantial measure over that achieved in the other runs. It is therefore concluded that the THF extracted 1442A catalyst in combination with the colloidal catalyst suspension identified as ACT-33 contributed a synergistic relationship not fully understood in achieving the highest conversion of asphaltenes to oil and gas products. It is also observed that the gas products ($C_1$-$C_4$ gases) of run 2 are less than that obtained in the other runs. These data show that the production of hydrogen sulfide is higher in run number 2 than the other runs. One may conclude from these data that the activity and life of the catalyst particles employed in the hydrogenation of coal liquefaction products to produce oil is substantially improved by the addition of a colloidal suspension of the catalyst components to the reaction system being employed. Thus in the reaction system of the H-Coal Process it is proposed to add a colloidal suspension of the catalyst ingredients as herein identified and normally employed to maintain and/or sustain the activity of initially charged catalyst system over an extended period of operating time.

In yet another aspect, it is concluded that a spent catalyst recovered from a coal liquefaction-hydrogenation operation can be restored to a relatively high level of activity by extracting preasphaltene and asphaltene-type materials from the catalyst particles with solvents suitable for the purpose of either separately or in situ and using the extracted catalyst particles in admixture with suspended colloidal components to achieve a high degree of hydrogenation of coal liquefaction product to a desired liquid oil product.

The selectivity of the colloidal catalyst for oil production was considerably improved over thermally obtained product.

EXAMPLE IV

Catalyst Activity Test Program

Approximately 2 g of a colloidal catalyst suspended in an aqueous or organic solvent is added per 100 g of a suitable test hydrocarbon and processed at 316°–454° C. (600°–850° F.) and 1,000–2,000 psig under continuous molecular hydrogen addition. Catalyst activity is measured as a function of time in minutes versus the change in refractive index of the test hydrocarbon. The test hydrocarbon is preferably methylnaphthalene and a change in (RI) refractive index as a measure of hydrogenation activity, is kept below a 50% tetralin concentration to ensure that decalin production does not confuse the RI change or rate determination. Gas chromatography is also used to determine the degree of hydrogenation.

The methylnaphthalene can be either a diesel reference fuel which contains sulfur and nitrogen impurities or a methylnaphthalene concentrate from a high endpoint reforming operation such as Panasol or Marasol (these require benzo-thiopene and quinoline additions). Sulfur and nitrogen removal is measured at the end of a test period to determine heteroatom removal rates. Gas analysis permits evaluation of hydrocracking activity. The colloidal catalyst composition (system) may also be substantially heated and sulfided prior to addition to the reaction system or accomplished in situ.

The catalyst tests above outlined are designed to be very sensitive to changes in catalyst activity, as contrasted to coal liquefaction system where significant changes are often masked by gross system effects. The best catalyst systems selected on the basis of the outlined tests are then tested for efficiency in an actual coal liquefaction operation.

A microautoclave system is generally composed of four nominal 50 cc batch tubing bomb reactors immersed in a fluidized sand bath for temperature control. Agitation is provided, as are gas supply systems. Coal, solvent and catalysts are batch charged to the reactors. Products are quantitatively recovered, including gas volume and sample, solids, preasphaltenes, and asphaltenes. Oil yields are calculated by difference.

Test conditions generally vary according to needs, but general conditions are listed below:
Temperature: 399° C.–454° C. (750°–850° F.)
Pressure: 500–1000 psig Cold Hydrogen Charge
Reaction Time: 30–40 minutes
Coal Charge: 5 grams
Solvent Charge: 10–15 grams
Catalyst Charge: 0–3 grams Having thus generally described the method and concept of this invention and discussed specific examples in support thereof, it is to be understood that no undue restrictions are to be imposed by reasons thereof except as defined by the following claims.

What is claimed is:

1. A method for preparing colloidal size particles of hydrogenation catalyst suitable for use in a coal liquefaction process involving a solvent which comprises:
    (a) preparing by agitated mixing a cellusolve dispersion containing a colloidal support material selected from the group consisting of silica colloid, alumina colloid and alumina-coated silica colloid particle material,
    (b) preparing an aqueous solution of two or more hydrogenation metal compounds
    (c) slowly adding drops of said cellusolve dispersion comprising said selected colloidal support material to said aqueous solution of said hydrogenation metal compounds at a temperature and with agitation sufficient to avoid irreversible coagulation of colloids to form a dispersible colloid, and
    (d) dispersing said dispersible colloid in a liquid which is miscible with said solvent used in said coal liquefaction process.

2. The method of claim 1 in which the hydrogenation metal compounds are oxides selected from the group consisting of cobalt-molybdate, nickel-molybdate, and nickel-tungstate.

3. The method of claim 1 wherein said liquid of step (d) is selected from the group consisting of tetralin, benzene, naphthalene, phenanthrene and anthracene.

4. The method of claim 1 wherein said colloidal size particles of hydrogenation catalyst has a size within the range of 25 to 235 Angstroms.

5. The method of claim 1 wherein said collidal size particles of hydrogenation catalyst has a size selected from within the range of 25–75 Angstroms.

6. The method of claim 1 wherein said hydrogenation metal compound are prepared from two or more compounds of from 1–8 wt. % nickel oxide, 2–8 wt % cobalt oxide; 3–20 wt. % molybdenum oxide and 5–20 wt. % tungsten oxide.

7. The method of claim 1 said hydrogenation metal compounds are prepared from one or more of from 1 to 4 wt. % of nickel oxide; 1–4 wt. % cobalt oxide and 3–12 wt. % of tungsten oxide.

8. A method for preparing a colloidal hydrogenation catalyst suspension in liquid medium which comprises:
    (a) dispersing deionized colloidal $SiO_2$ acidic sol of about 3.2 pH in a water miscible organic phase, coating said colloidal $SiO_2$ with alumina,
    (b) adding $CoCO_3$ powder to a hot agitated acidic molybdena water solution,
    (c) diluting said alumina-coated colloidal silica organic phase of (a) with ethyl cellusolve to displace said water miscible organic phase with ethyl cellusolve to form a diluted alumina-coated silica colloid.
    (d) adding said diluted alumina-coated silica colloid as droplets very slowly with ultrasonic agitation at about 80° to 85° C. to the cobalt-molybdena water solution formed in (b),
    (e) replacing water present in the mixture of step (d) with ethyl cellusolve, and
    (f) substantially replacing the ethyl cellusolve in the mixture of step (e) with a solvent medium selected from the group consisting of tetralin, benzene, naphthalene, phenanthrene and anthracene.

9. A method for preparing colloidal hydrogenation catalyst particles which comprises:
    (a) adding to deionized water hydrogenation metal-containing materials to form an aqueous solution of materials selected from the group consisting of cobalt-molybdate, nickel-molybdate and nickel-tungstate,
    (b) adding slowly and with ultrasonic agitation at about 80° to 85° C. droplets of a celluosve dispersion comprising colloidal siliceous material to said solution of (a),
    (c) adding cellusolve to the dispersion of step (b), after a sequence of controlled evaporations, to replace water lost by said evaporations and
    (d) effecting further evaporations of the resulting mixture to provide said colloidal hydrogenation catalyst particles in said mixture deep blue in color by gradually raising the temperature during said further evaporations, and replacing the cellusolve lost during said further evaporations with a solvent selected from the group consisting of tetralin, benzene, naphthalene, phenanthrene and anthracene.

10. A colloidal particle size catalyst composition which comprises colloidal particles of a size in the range of 25 to 200 Angstroms in diameter consisting of hydrogenating components selected from the group consisting of cobalt-molybdate, nickel molybdate and nickel-tungsten distributed on colloidal particles selected from the group consisting of colloidal alumina, colloidal silica colloidal titania alumina-coated colloidal silica, 11. The catalyst composition of claim 10 in which the catalyst comprises from 1-4 wt. % nickel oxide, 1-4 wt. % cobalt oxide, and 3-12 wt. % tungsten oxide.

12. The catalyst composition of claim 10 in which the catalyst comprises from 1-8 wt. % nickel oxide and 3-20 wt. % molybdenum oxide.

13. The catalyst composition of claim 10 in which the catalyst comprises from 2-8 wt. % cobalt oxide and 5-20 wt. % molybdenum oxide.

14. The catalyst composition of claim 10 in which the catalyst comprises from 1-8 wt. % nickel oxide and 5-20 wt. % tungsten.

15. The catalyst composition of claim 10 in which the catalyst comprises colloidal titania.

16. The catalyst composition of claim 10 wherein said particle size is in the range of 25 to 75 Angstroms in diameter.

17. The catalyst composition of claim 10 in which the colloidal particles are dispersed in a liquid medium miscible with an oil product of coal liquefaction.

* * * * *